United States Patent [19]

Hynes

[11] 4,210,319
[45] Jul. 1, 1980

[54] COPY SET COUNTER DUPLEX TRAY

[75] Inventor: Frank R. Hynes, Rochester, N.Y.

[73] Assignee: Xerox Corporation, Stamford, Conn.

[21] Appl. No.: 919,892

[22] Filed: Jun. 28, 1978

[51] Int. Cl.² .............................................. B65H 1/24
[52] U.S. Cl. ..................................... 271/3.1; 271/166
[58] Field of Search ................. 271/145, 166, 4, 3.1; 355/14, 24, 26

[56] References Cited

U.S. PATENT DOCUMENTS

| | | | |
|---|---|---|---|
| 3,588,472 | 6/1971 | Glaster | 235/92 |
| 3,819,266 | 6/1974 | Price | 355/64 |
| 3,944,794 | 3/1966 | Reehil | 235/92 SB |
| 4,050,805 | 9/1977 | Hage | 355/24 X |
| 4,116,558 | 9/1978 | Adamek | 271/3.1 |

OTHER PUBLICATIONS

Research Disclosure, May 1978, pp. 27–29, Item No. 16938, "Separator Member Drive Mechanism".

Primary Examiner—Richard A. Schacher
Attorney, Agent, or Firm—William A. Henry, II

[57] ABSTRACT

A system for maintaining job integrity in a duplex copying apparatus is disclosed wherein the number of a first set of sheets coming into a duplex tray is counted and compared for coincidence with the number of the first set of sheets leaving the tray before separator fingers are retracted to allow the following sets of sheets to drop into position to be feed out of the tray.

9 Claims, 3 Drawing Figures

COPY SET COUNTER DUPLEX TRAY

SUMMARY AND BACKGROUND OF THE INVENTION

This invention relates to paper handling systems, and more particularly, to a duplex copying system that maintains job integrity during duplexing.

Duplex copying systems that employed copy set storage means in the past have used set separators, bottom feeders and duplex return transport means to achieve the duplex function.

Bottom sheet feed devices have been employed as duplex buffer set trays in the past and have included pressurized air to reduce friction between the bottom sheet and the sheet stack tray and minimize friction between the bottom sheet and sheets immediately adjacent thereto.

Problems encountered during the use of such systems included some misfeeding of sheets which reduced reliability of the systems and tended to discourage their use because one would not have an indication when a misfeed occurred and therefore, would not know whether the output of the copier included a complete set of duplexed copies or not.

The present invention is intended to overcome the above-mentioned disadvantages and comprises a system for detecting misfeed of one-sided copy sheets from a duplex tray and includes counting the number of sheets coming into the duplex tray and comparing for coincidence that count with the number of sheets leaving the duplex tray before set separator fingers allow the next set of copies to drop into position to be fed out of the duplex tray. When a complete set or book is counted in the tray, a solenoid is energized which rotates a pair of set separator fingers above the set. Sheets of the following book can now continue to be fed into the tray, at the same time sheets are fed out of the tray. If the machine logic counts the same number of sheets of the first book fed out as was fed in, the fingers will retract to allow the second set to fall into place for feeding. If, however, a double feed has occurred, the logic would not energize the solenoid because a full count had not been reached in the required time and a machine shut-down would occur.

PRIOR ART STATEMENT

Various prior art structures are known for controlling copying systems including U.S. Pat. No. 3,588,472, issued Nov. 18, 1966 to Thomas H. Glaster et al. which discloses a system wherein the number of record sheets entering a transport path of a reproduction apparatus are monitored along with the number of copies egressing from the transport path. The respective numbers are compared with the number of copies desired and this comparison is utilized to step up or step down a reversible counter means to indicate the number of original documents from which the requisite number of copies have been made, completed, and delivered to a sorting area. Edward G. Reehil et al. in U.S. Pat. No. 3,944,794, issued Mar. 16, 1976, disclose a copying system that employs counters in order to automatically produce a programmed number of copies in a copying machine in the event a malfunction occurs before the program is completed. U.S. Pat. No. 3,819,266, issued June 25, 1974 to Harry C. Price, shows a copying system incorporating means to stop the system in the event of a jam and the RESEARCH DISCLOSURE of May, 1978 on pages 27-29, Item No. 16938, shows a separator member drive mechanism for an automatic document handler.

An exemplary embodiment of the present invention is shown and described herein below as incorporated into an otherwise conventional exemplary xerographic apparatus and process. Accordingly, said xerographic apparatus and process itself need not be described in detail herein since various publications, patents, and known apparatus are available to teach details thereof to those skilled in the art.

BRIEF DESCRIPTION OF THE DRAWINGS

Further features and advantages of the present invention pertaining to the particular apparatus, steps and details whereby the above-mentioned aspects of the invention are attained will be included below. Accordingly, the invention will be better understood by reference to the following description and to the drawings forming a part thereof.

DESCRIPTION OF PREFERRED EMBODIMENT

Figure 1:
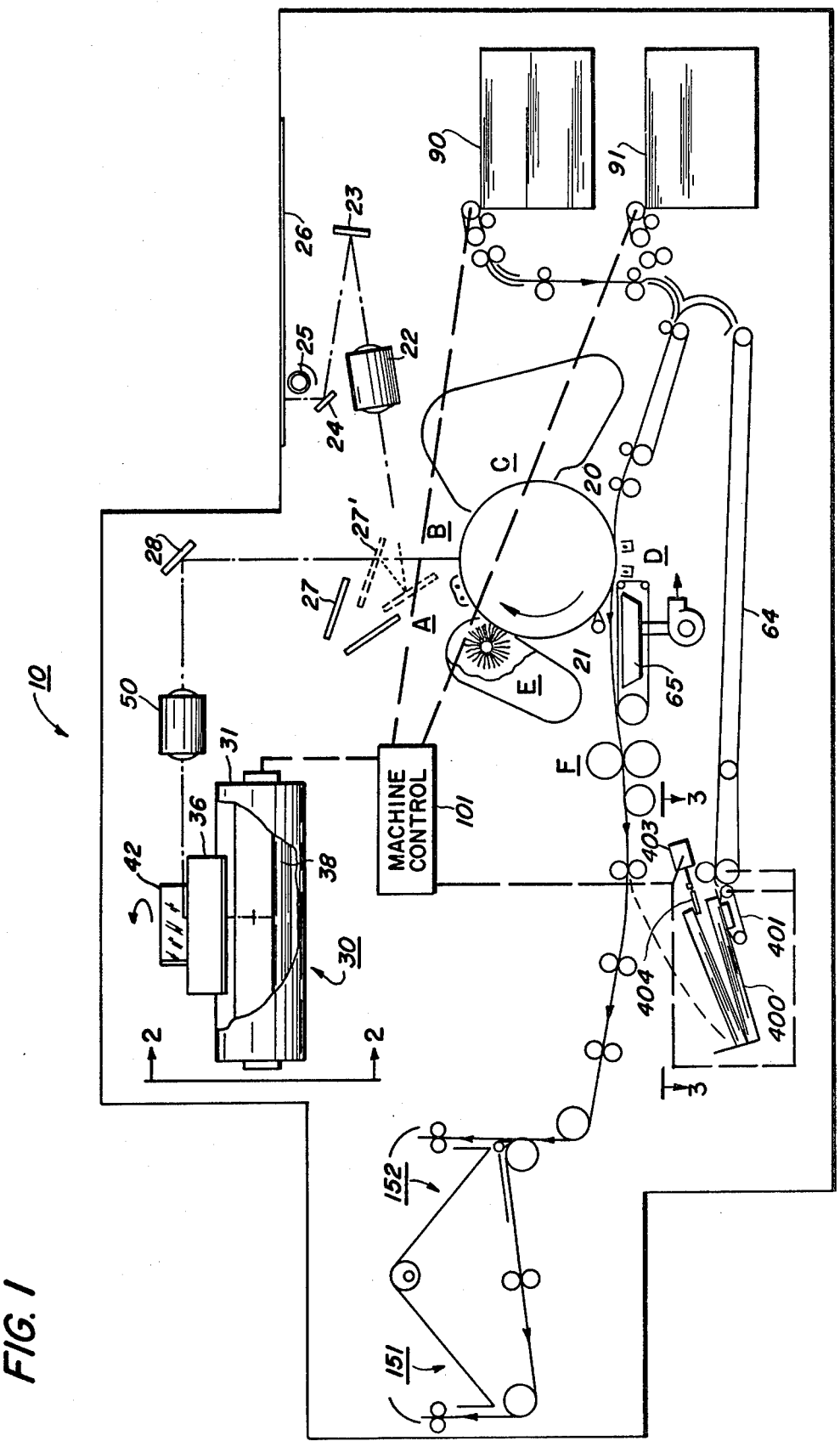
FIG. 1 is a side view of a bi-directional xerographic copying system with collated copy sheet output in accordance with the present invention.

Referring to FIG. 1, there is shown a schematic illustration of an exemplary reproduction machine 10 that employs a set counter duplex tray means that will accomplish the objectives of the present invention. It includes a conventional photoconductive layer or light sensitive surface 21 on a conductive backing and formed in the shape of a drum which is mounted on a shaft journaled in a frame to rotate in the direction indicated by the arrow to cause the drum surface to pass sequentially a plurality of xerographic process stations. It should be understood that belt photoreceptor and flash exposure could be used instead of the photoreceptor and exposure means in FIG. 1.

For purposes of the present disclosure, the several generally conventional xerographic processing stations in the path of movement of the drum surface may be described functionally as follows:

a charging station A at which the photoconductive layer of the xerographic drum is uniformly charged;

an exposure station B at which a light or radiation pattern of a document could be reproduced is projected onto the drum surface to dissipate the drum charges in the exposed areas thereof, thereby forming the latent electrostatic image of a copy to be reproduced;

a developing station C where xerographic developers are applied to the photoconductive surface of the drum to render the latent image visible;

a transfer station D at which the xerographic developer image is electrostatically transferred from the drum surface to a transfer support material;

a drum cleaning station E at which the drum surface is brushed to remove residual toner particles remaining thereon after image transfer; and a fusing station F at which point the image is fused to the copy paper for support material.

For copying, the xerographic apparatus 10 disclosed herein projects an image from the automatic web scroll document handling apparatus 30 described in U.S. Pat. No. 3,963,345, issued to D. Stemmle and M. Silverberg, which disclosure is incorporated herein by reference.

The document images are projected through lens 50 down from mirror 28 of FIG. 1 onto the photoreceptor 20. The image is developed on the photoreceptor surface 21 and rotated clockwise to a transfer station D. Copy sheets coming from either the main copy sheet feeding tray 90 or the auxiliary sheet feeding tray 91 are fed by a series of sheet feeding rollers to the transfer station D in order to accept the developed image from the photoreceptor drum 20 at the transfer station D. Vacuum stripping means 65 strips the paper from the photoreceptor 20 and transports it toward fuser F so that the image can be fused onto the copy sheet. Thereafter, the copy sheet is transported either to duplex tray 400 or to an output sheet tray 151 or 152. For simplex copies, the duplex tray or holding means 400 is not utilized. Documents can be imaged in the apparatus of FIG. 1 either from the automatic document handler or from platen 26. For uni-directional document copying, all of the sets will be in one output tray. The same output tray 151 is used whether the copies are simplex or duplex. Collation occurs without an inverter. For bi-directional copying, alternate sets are ultimately placed in trays 151 and 152. The forward order copies go into tray 151, and the reverse order copies go into tray 152.

Figure 2:
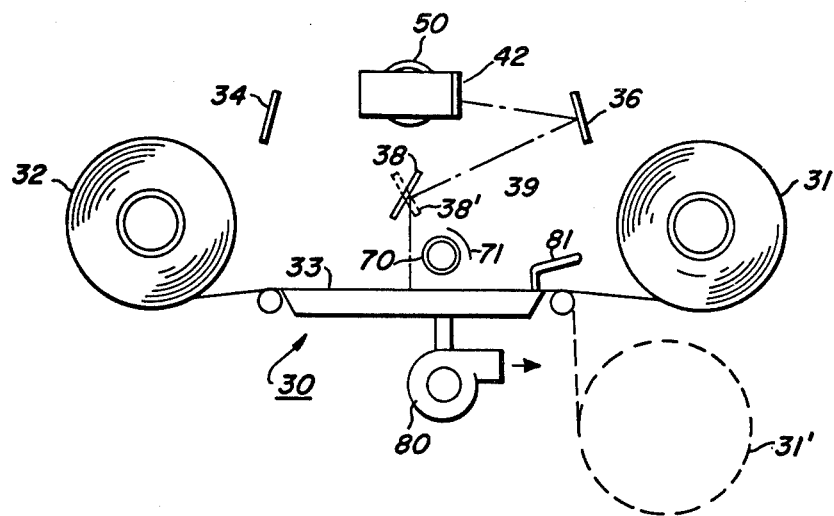
FIG. 2 is a side view taken along line 2—2 of the automatic document handling apparatus shown partly cut away in FIG. 1.

As shown in FIG. 2, documents are loaded by being placed onto web 33 against registration means 81 while scroll 31' is in the load/unload position. As the documents are moved by the automatic document handler (hereinafter called ADH), they are exposed to light directly from exposure lamp means 70 and reflected through reflector means 71 off the document into a bi-directional optical system for projection of the document image onto photoreceptor 20. Each sheet is conveyed passed exposure means 70 and reflector means 71 and wound onto scroll means 32 after scroll means 31 has been moved into recirculation position. Subsequently, scroll means 32 is reversed in direction toward scroll means 31 to allow re-exposure of documents wound around in a reverse scan mode.

For the first exposure of the documents on page images on the web, only even numbered documents are imaged, i.e. documents located in the 2, 4, 6, 8, etc. positions on web 33. Depending on whether uni-directional or bi-directional copying is desired, the buffer set is a one-set or two-set buffer, respectively. For uni-directional copying, a fast reverse rewind is accomplished and only one buffer set is required. For bi-directional copying, the even numbered documents are also imaged during reverse movement of the web to create two-buffer sets, one in ascending order (2, 4, 6 . . . ) and one in descending order (8, 6, 4, 2). In either case, copies made from exposure of the even numbered documents are fused at station F and continued in transportation on a conventional conveyor system into buffer set counter tray means 400.

It is within the set counter duplex tray area that the present invention resides in that documents in the ADH are imaged, even numbered documents first on a forward pass of the ADH with the images obtained from the documents being transferred to copy sheets fed from copy sheet tray 90. After the images have been transferred at station D, the one-side imaged sheets are then forwarded toward duplex tray 400. In order to keep job integrity, it is necessary to count sheets of paper or one-sided copies as they come into the duplex tray and count the copies as they egress from the duplex tray. The number of copies in must equal the number of copies out before set separator fingers 404 will retract and allow the next set of one-sided copies to fall into the bottom of the duplex tray 400 in order to be refed for duplexing.

When a complete set or book is counted in the tray, a solenoid 403 is energized which in turn rotates a pair of fingers 404 above what is now the leading edge of the copies in the duplex tray. Sheets of the following book or set can now continue to be fed into the tray, at the same time copies of the first book are being fed out of the tray. If machine logic counts the same number of sheets of the first book fed out as were fed into the tray, the fingers 404 will retract to position 404', shown in FIG. 3, and allow the second set to drop into place for feeding by vacuum feeder means 401. If a double feed has occurred, the logic would not de-energize the solenoid because a full count had not been reached in the required time, and a machine shut-down would occur.

A programmable machine controller 101 is used to control the operation of xerographic reproduction in either the simplex or duplex modes of copier 10, such as, the controller disclosed in U.S. Pat. No. 3,940,210, which is incorporated herein by reference. The controller includes appropriate logic for counting the number of copies entering the duplex tray, counting the number of copies exiting the duplex tray, comparing the two counts, and means for actuating solenoid 403 to retract fingers 404 and allow a first set of copies to fall into feeding position while controlling actuation of the fingers for a second set of copies only when there is coincidence between ingress copies and egress copies from the duplex tray. Also, conventional counters and circuitry as disclosed in U.S. Pat. No. 3,588,472 to Thomas Glaster et al., issued June 28, 1971, could be used to carry out the invention as disclosed herein and is incorporated herein by reference as would be necessary to perform the present invention.

Now referring more specifically to the apparatus of the present invention and FIG. 1, it can be seen that duplex tray means 400, as well as vacuum feed means 401 and transport means 64, are controlled by machine control means 101 with the transport means 64 and vacuum feed means 401 being actuated in response to the completion of a set of one-sided copy sheets entering duplex tray means 400 to feed the set of copy sheets back toward transfer station D. On succeeding passes on the automatic document handler, forward and reverse, all documents are imaged with copy substrates being fed from the copy sheet tray 90 to transfer station D alternately with copy sheets fed from feeding means 401. Copy sheets fed from primary copy sheet tray 90 receive images of even positioned documents in the ADH and are fed to buffer tray means 400 while copy sheets that are fed from feeding means 401 alternate with the sheets fed from the primary copy sheet tray and receives images on the reverse side thereof of odd positioned documents in the ADH and are fed to output station 151 for copy sets made on the forward pass, or station 152 for copy sets made on the reverse pass, so that once a completed, collated set of documents have been collected in the output station, they may be stapled and side stacked or staggered, and they will still read in consecutive ascending order, for instance, 1, 2, 3, 4, 5, 6, etc. On the last pass of web 33 past the exposure station 70, only odd numbered or positioned documents are imaged. The images are then copied on the back of copies previously made from even numbered documents that are fed by feeding means 401. This process empties the feeding means 401 and presents the final set of duplexed copies to the output station. However, if a two-set buffer is used, i.e., if the ADH imaged documents on both the forward and reverse scans, odd numbered documents (only) are imaged on both of the final forward and reverse scans of web 33 in order to make complete duplexed copies of the two sets of evens adapted for feeding by means 401 in order to finish the duplex run of collated sets with an empty transport means 64 and feeding means 401.

It should be understood that odd numbered documents could be imaged on the first pass of the ADH, however, to do so would require an extra pass of the last copy sheet through the transfer station without putting an image on the even side thereof in the copying of an odd numbered document set, e.g. a set of 5 documents. Various other ways of using the machine disclosed in use with the present invention are disclosed by John A. Adamack and Richard T. Ziehm, in U.S. Pat. No. 4,116,558 commonly assigned with the present application which disclosure is incorporated herein by reference as is necessary for implementation of the present invention.

In reference to FIG. 2, an optical system for scanning documents in both directions of relative reciprocal motion between the documents and the optical system is shown. The document is first scanned in one direction, then the image orientation is rotated 180° about the axis of propagation for scanning in the reverse direction. Properly oriented images are thus projected onto photoreceptor 20 and move in the same direction during both directions of scan, i.e., moving in the same direction as the photoreceptor surface in both cases without reversing the photoreceptor movement. This is more fully disclosed in U.S. Pat. No. 4,008,958, issued Feb. 22, 1977 to D. O. Kingsland, commonly assigned with the present application.

Figure 3:
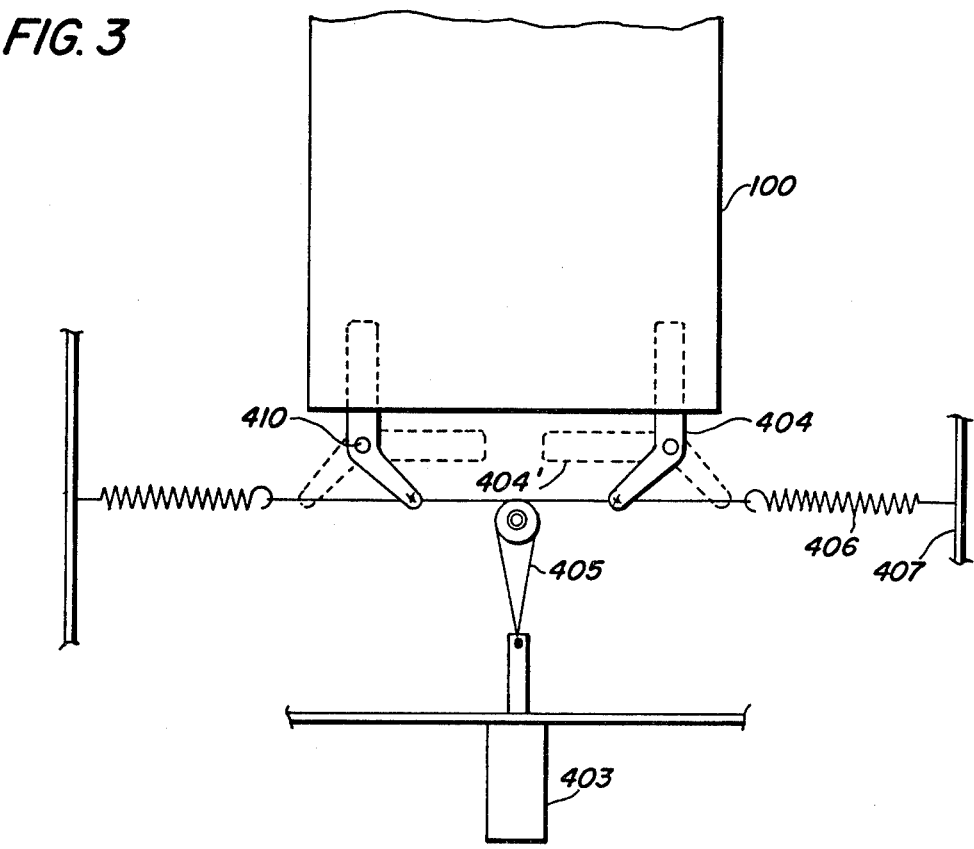
FIG. 3 is an enlarged top view along line 3—3 of FIG. 1.

Referring now to FIG. 3, the advantage of the present invention of detecting misfeeds from a duplex tray is shown. Job integrity in a duplex copying system is maintained with the use of machine controller 101 by counting the number of one-side imaged copies 100 as they come into duplex tray 400. The copies initially come to rest against set separator fingers 404 which are adapted for rotation about shaft 410 to a retracted position. When a complete set of copies is counted, solenoid 403 is actuated by controller 101 and serves to rotate cable 405, which is attached to tension springs 406. The springs are attached to stationary wall members 407. Energization of solenoid 403 rotates set separator fingers 404 through cable 405 to retracted position 404' and allows the completed set of one-sided copies to fall into feeding position adjacent vacuum feed means 401. Afterwards, the solenoid is de-energized and the fingers assume their non-retracted position.

One-side imaged copies of the next set can now continue to be fed into tray 400 and rest against set separator fingers 404 at the same time sheets are being fed from tray 400 by feeding means 401. If controller 101 counts the same number of copies of the first set fed out was fed in, set separator fingers 404 are retracted by solenoid 403 and the second set of copies fall into position for feeding. If a misfeed occurs, machine controller 101 will not energize solenoid 403 and the fingers will not retract.

In conclusion, a duplex copying system is disclosed in which page images are formed on both sides of copy sheets by copy processing means one side at a time to form multiple copy sheet sets. The copying system of the present invention includes machine logic to indicate that a misfeed of copy sheets has occurred. A controller counts the number of sheets coming into a duplex tray and the number of sheets going out of the tray. The number of sheets in, must equal the number of sheets out, before the set separator fingers will retract and allow the following set of sheets to fall into feeding position to be fed out of the tray.

In addition to the method and apparatus disclosed above, other modifications and/or additions will readily appear to those skilled in the art upon reading this disclosure and are intended to be encompassed within the invention disclosed and claimed herein.

What is claimed is:

1. A duplex copying system for detecting copy sheet misfeeds comprising:
    (a) processing means for placing page images on one side of copy sheets;
    (b) stationary duplex copy set tray means for receiving the copy sheets and feeding the copy sheets therefrom;
    (c) set separator means located within said tray means for separating multiple copy sheet sets, said set separator means adapted for movement between nonretracted and retracted positions; and
    (d) machine control means for counting the number of one-sided copies entering said duplex tray and the number of one-sided copies exiting the duplex tray and retracting said separator fingers when there is coincidence between the number of copies entering the duplex tray and the number of copies exiting the duplex tray to allow additional sheets to fall into feeding position in said duplex tray.

2. The misfeed detecting system of claim 1 wherein said machine control counts incoming sheets of a first set of copies and retracts said separator means upon completion of the first set copies to allow the copies to fall into position for feeding from the duplex tray.

3. The misfeed detecting system of claim 2 wherein said machine control actuates solenoid means to retract said set separator means.

4. The misfeed detecting system of claim 2 wherein said set separator means comprises fingers.

5. The misfeed detecting system of claim 1 wherein non-coincidence of incoming and outgoing sheets from said duplex tray results in processing means shut-down.

6. A duplex copying system including means for maintaining copy set job integrity, comprising:
    stationary duplex tray means including two position separator means located within said duplex tray means for separating multiple copy sets within said tray;
    first counter means for counting the number of copies in a set entering said duplex tray;
    second counter means for counting the number of copies from the set exiting the duplex tray; and
    control means for actuating said separator means to one of said two positions upon coincidence of said first and second counters to allow the next set of copies to fall into feed position within said duplex tray.

7. The duplex system of claim 6 wherein non-coincidence between said said first and second counters creates a machine shut-down condition.

8. A method of detecting misfeeds in a duplex copying system, comprising the steps of:
(a) providing a stationary duplex tray with set separator fingers located therein to separate multiple sets of copies between feeding and non-feeding positions within the tray;
(b) counting the number of copy sheets in a set coming into said tray;
(c) counting the number of copy sheets of the set fed from said tray; and p1 (d) comparing for coincidence between the copies counted in steps (b) and (c) above and retracting the separator fingers if there is coincidence between the two steps and not retracting the fingers if there is no coincidence and thereby indicating a misfeed.

9. A duplex copy set monitoring system comprising:
stationary duplex set holding means;
first counter means for counting copies as they enter said duplex set holding means;
set separator means located within said holding means and actuated in response to completion of a first set of copies entering said holding means such that a second set of copies entering said holding means will be separated from said first set of copies;
second counter means for counting each copy that exits said holding; and
comparator means for comparing signals from said first counter means with signals received from said second counter means and based upon coincidence between the two signals, actuating said set separator means to withdraw said separator means and allow a second set of copies to fall into said holding means.

* * * * *